United States Patent
Yang et al.

(10) Patent No.: US 7,768,890 B2
(45) Date of Patent: Aug. 3, 2010

(54) APPARATUS AND METHOD FOR CALIBRATING FOCUS BALANCE IN AN OPTICAL DISK DRIVE

(75) Inventors: Hung-Pin Yang, Taoyuan County (TW); Wei-Ting Huang, Taoyuan County (TW); Shih-Jung Huang, Taoyuan County (TW)

(73) Assignee: Quanta Storage Inc., Guishan, Taoyuan County (TW)

( * ) Notice: Subject to any disclaimer, the term of this patent is extended or adjusted under 35 U.S.C. 154(b) by 400 days.

(21) Appl. No.: 11/968,472

(22) Filed: Jan. 2, 2008

(65) Prior Publication Data
US 2009/0003149 A1    Jan. 1, 2009

(30) Foreign Application Priority Data
Jun. 26, 2007    (TW) .............................. 96123223 A

(51) Int. Cl.
*G11B 7/125* (2006.01)

(52) U.S. Cl. .............. 369/53.28; 369/44.13; 369/44.14; 369/53.23

(58) Field of Classification Search ....................... None
See application file for complete search history.

(56) References Cited

U.S. PATENT DOCUMENTS

| | | | |
|---|---|---|---|
| 2001/0010667 A1* | 8/2001 | Nakajo ..................... | 369/44.13 |
| 2002/0024897 A1* | 2/2002 | Nakajima ................. | 369/44.13 |
| 2003/0099168 A1* | 5/2003 | Ma et al. .................. | 369/44.13 |
| 2006/0002249 A1* | 1/2006 | Hsu et al. ................. | 369/44.27 |
| 2006/0233070 A1* | 10/2006 | Kurokawa et al. ........ | 369/44.23 |

* cited by examiner

*Primary Examiner*—Christopher R Lamb

(57) ABSTRACT

The present invention is to provide an apparatus and method for calibrating focus balance in an optical disk drive. A focus servo unit controls a pick-up head to focus and read a mark for generating an RF signal. A jitter generator separates a jitter signal from the RF signal to form a jitter frequency. A focus balance unit compares sequential jitter frequencies to check the convergence and the goal, and determines the direction and variable of calibrating focus balance to generate an error signal. A compensator receives the error signal through the focus servo unit to control the pick-up head for calibrating focus balance.

14 Claims, 4 Drawing Sheets

APPARATUS AND METHOD FOR CALIBRATING FOCUS BALANCE IN AN OPTICAL DISK DRIVE

FIELD OF THE INVENTION

The present invention relates to an optical disk drive, in particular to an apparatus and method for calibrating focus balance in an optical disk drive with jitter frequencies.

BACKGROUND OF THE INVENTION

Since data are recorded on an optical disk with dense minute marks, an optical disk drive must use an optical pick-up head to project laser light focused on the marks and convert the magnitude of the light reflected by the marks into a digital signal which is then decoded into a data signal. Therefore, the accuracy of focus may directly influence the magnitude of the received signal and the correctness of data.

As shown in FIG. 1, a conventional method for calibrating focus balance in an optical drive which employs a pick-up head 1 to project a light beam 2 onto a optical disk 3, and the optical disk 3 reflects the light beam 2 onto a photodetector 4 through the pick-up head 1. The photodetector 4 has four equally divided light receiving sections A, B, C, and D, each of which receives a different portion of the reflected light beam and converts the received light into an electrical signal of corresponding magnitude. The electrical signal is then input into an amplifier 5. The electrical signals from the light receiving sections A and C and the light receiving sections B and D are added respectively to form the electrical signals (A+C) and (B+D), and then the electrical signal (B+D) is subtracted from the electrical signal (A+C) to form a differential signal. The differential signal is then amplified to form a focus error signal FE (Focus Error) and transferred to a compensator 6. The compensator 6 generates a control signal, which controls and calibrates the pick-up head through a focus servo unit 7 to lock the focus spot on the mark of the fast spinning and vibrating optical disk 3, such that the four light receiving sections of the photodetector 4 are able to accurately receive the reflected light. An amplifier 8 adds the electrical signals (A+B+C+D) to form a radio frequency signal RF (Radio Frequency) and uses the signal representing the mark to enhance the reliability of the output data signal from the radio frequency signal RF modulated by the modulator 9.

However, since the focus spot is a small region of short distance, the aforementioned focus spot locked by focus calibration might not be the location of the strongest radio frequency signal RF. Also, the aforementioned focus calibration employs a small electrical signal as means for determination, which is susceptible to the errors of the disk drive itself such as the non-uniformity of the light beam projected by the laser light source, the precision of the optical system, or the heterogeneity of the light receiving materials forming the four light receiving sections of the photodetector 4, leading to difficulty in ensuring locking of the focus spot. As a result, there is another conventional apparatus for calibrating focus balance in an optical disk drive, in which the amplifier 8 outputs a radio frequency signal RF and the radio frequency ripple circuit (RFRP), i.e. RFRP circuit 10, is used to convert the radio frequency signal RF into a waveform of the RFRP signal. The focus balance unit 11 records and compares several sequential RFRP signals to find out the strongest RFRP signal, and then generates an error signal. The compensator 6 generates a control signal and locks the focus spot range in combination with a focus error signal FE. The focus servo unit 7 controls and calibrates the pick-up head 1 to achieve the focus condition of the strongest RFRP signal, which directly ensures the radio frequency RF used by the pick-up head 1 for reading the marks is the strongest in order to facilitate decoding.

However, the single radio frequency signal RF only represents a mark of binary code 1 or 0, which still needs modulation and cannot be directly output by the optical disk drive. Taking the conventional EFM (Eight to Fourteen Modulation) for example, the original 8-bit digital signal is modulated into a 14-bit signal to form a mark on the optical disk in the binary digit form of 1 or 0. As a result, the pick-up head must completely receive the 14-bit radio frequency signal RF one by one before being accurately demodulated into an 8-bit digital signal by the modulator 9. Making the radio frequency signal RF of a single mark the strongest does not guarantee that the other marks in the same group of digital signals are also the strongest. Sometimes, in the course of seeking the strongest radio frequency signal RF, the focus calibration tends to result in obscurity of some marks in a group of digital signals and leads to failure in demodulation. Therefore, the method for seeking the strongest radio frequency signal RF still fails to effectively enhance the whole performance of the optical disk drive. Accordingly, there are still problems to be solved in the conventional method for calibrating focus balance in a disk drive.

SUMMARY OF THE INVENTION

An objective of the present invention is to provide an apparatus for calibrating focus balance in an optical disk drive, wherein a jitter frequency is generated by a jitter generator, and the convergence of the jitter frequency is checked by a focus balance unit for calibrating focus balance, thereby enhancing the total performance in the disk drive.

Another objective of the present invention is to provide a method for calibrating focus balance in an optical disk drive, which rapidly achieves an appropriate focus balance by examining the convergence of the sequential jitter signals for calibrating the variable and direction of focus balance.

In order to achieve the objectives of the invention, the apparatus for calibrating focus balance in an optical disk drive according to the present invention comprises a focus servo unit which controls a pick-up head to focus and read a mark for generating an RF signal; a jitter generator which separates a jitter signal from the RF signal to form a jitter frequency; a focus balance unit which compares sequential jitter frequencies input by the jitter generator to check the convergence and the goal of the jitter frequencies and determines the direction and variable of calibrating focus balance to generate an error signal; and a compensator which receives the error signal from the focus balance unit through the focus servo unit to control the pick-up head for calibrating focus balance.

The method for calibrating focus balance in an optical disk drive according to the present invention includes presetting the variable and direction of calibrating focus balance and examining whether the jitter frequency is less than the goal. If the jitter frequency is not less than the goal, then the calibration is terminated; otherwise a new jitter frequency is generated based on the predefined variable of calibrating focus balance, and the new jitter frequency is compared with the previous new jitter frequency. If the new jitter frequency is less than the previous one, then the direction of calibrating the variable ΔFB is changed, otherwise the original direction of calibrating the variable ΔFB is maintained. Then, the new jitter frequency is re-examined to determine whether it is greater than the goal. If yes, return to the calibration step to continue the calibration of focus balance, otherwise the calibration is terminated.

DETAILED DESCRIPTION OF THE INVENTION

The techniques employed by the present invention to achieve the above objectives and the effects thereof are described hereinafter by way of preferred embodiments in combination with the accompanying drawings.

Figure 2:
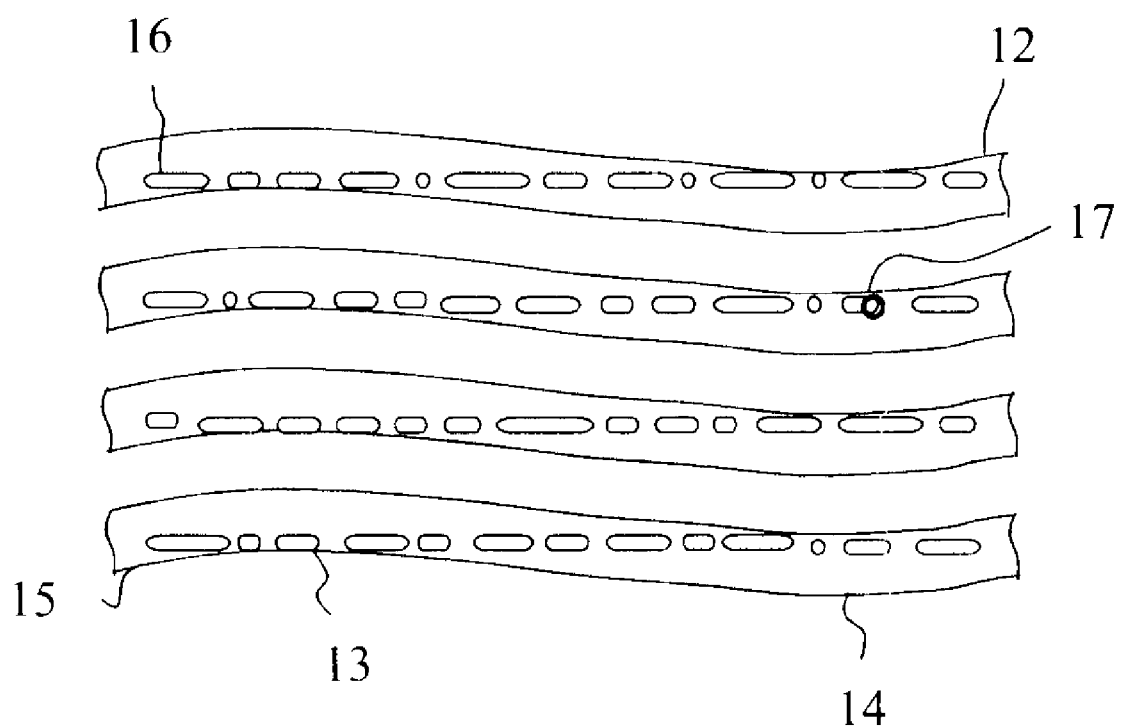
FIG. 2 shows the structure of tracks on an optical disk.

Referring to FIG. 2, the ordinary optical disk includes a spiral track 12 from the inside to the outside. The track 12 is a groove that the two sides of which become a peak 13 and a valley 14 with constant frequencies to form a wave edge 15. The data mark 16 modulated by EFM is spirally scribed in the groove of the track 12. As a result, the data mark 16 regularly and alternately approaches the wave edge 15 in turn and the laser spot 17 projected by the optical disk drive reads along the data mark 16 one by one with tracking-servo.

Figure 1:
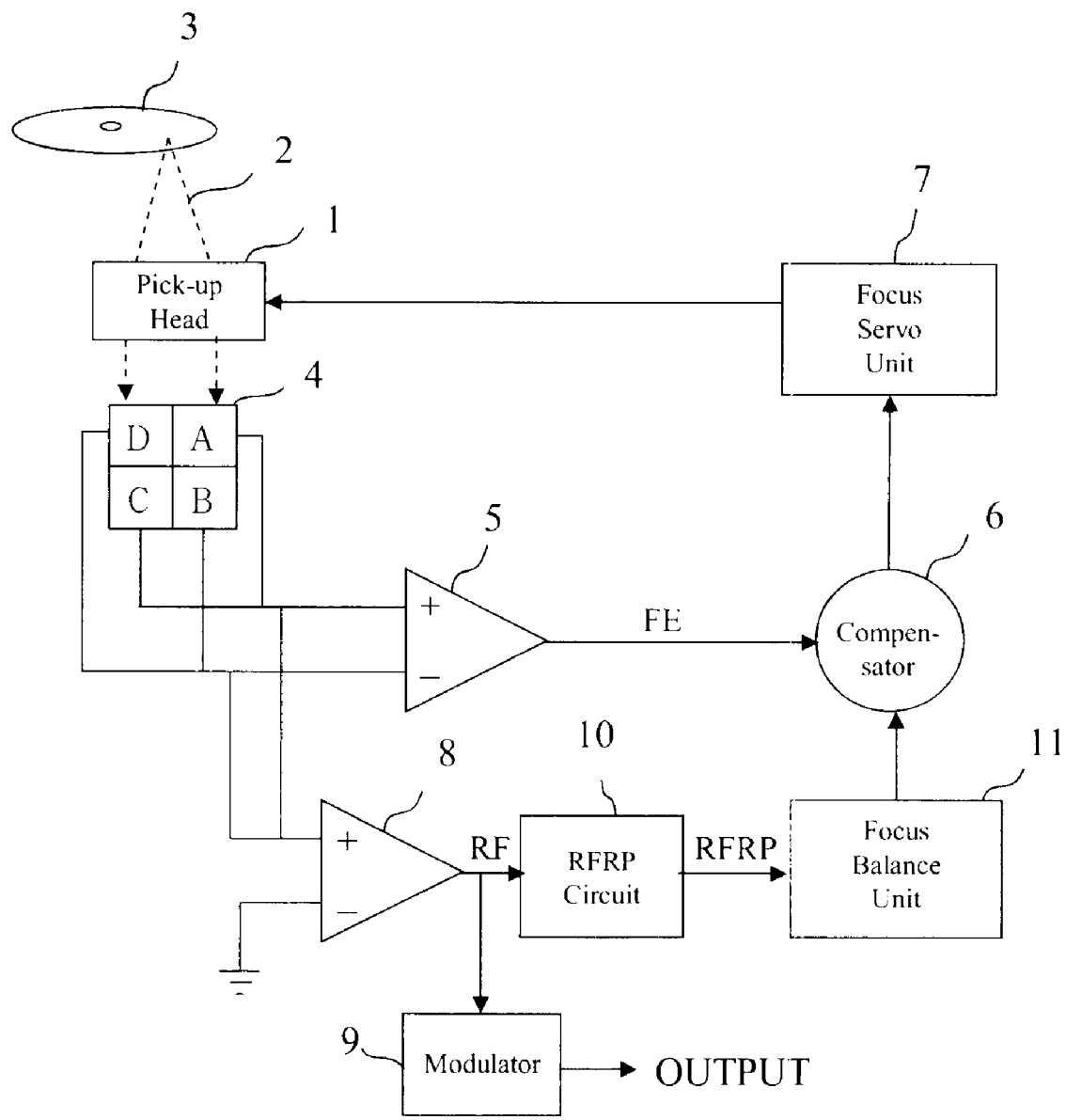
FIG. 1 is a functional block diagram of the conventional apparatus for calibrating focus in a disk drive.

When the laser spot 17 strikes the data mark 16, the photodetector in the pick-up head receives the light reflected by the data mark 16 (refer to FIG. 1). The photodetector forms two sections, an upper section (A+C) and a lower section (B+D), for receiving reflected light to generate an electrical signal. Since the wave edge 15 of the track 12 alternately approaches the upper and lower sides of the data mark 16, upon approaching the upper side, the reflected light received by the (A+C) section varies; on the contrary, upon approaching the lower side, the reflected light received by the (B+D) section varies. As a result, the received electrical signal forms a jitter with the wave edge 15, whereby a regular variation is derived from the electrical signal to obtain a jitter frequency, which is usually set to 23 kHz. Accordingly, when the pick-up head reads/writes data at different radii on the optical disk, the rotation speed of the spindle motor can be controlled based on the read jitter frequency, so that the read/write speed of the pick-up head is maintained at a desired speed. In the meantime, the address of the current read/write data may also be derived based on the rotation speed of the spindle motor in combination with the read jitter frequency. It is obvious that the jitter frequency is quite significant to the operation of the optical disk drive.

When the focus balance in the optical disk drive is appropriate, the weaker jitter signal can be easily separated from the received electrical signal to compute a jitter frequency, and the computed jitter frequency can be determined whether to be within an acceptable range based on a predefined jitter frequency. On the contrary, when the focus balance of the optical disk drive is abnormal, the weak jitter signal tends to be missing, and it is difficult to separate the accurate jitter frequency from the electrical signal, leading to deterioration of the jitter frequency. Thus, the abnormal focus balance can be determined once the jitter frequency falls out of the acceptable range. The present invention adopts this technique for calibrating focus balance and examining whether the variable of jitter frequencies falls within an acceptable range, so as to verify the accuracy of the focus balance.

Figure 3:
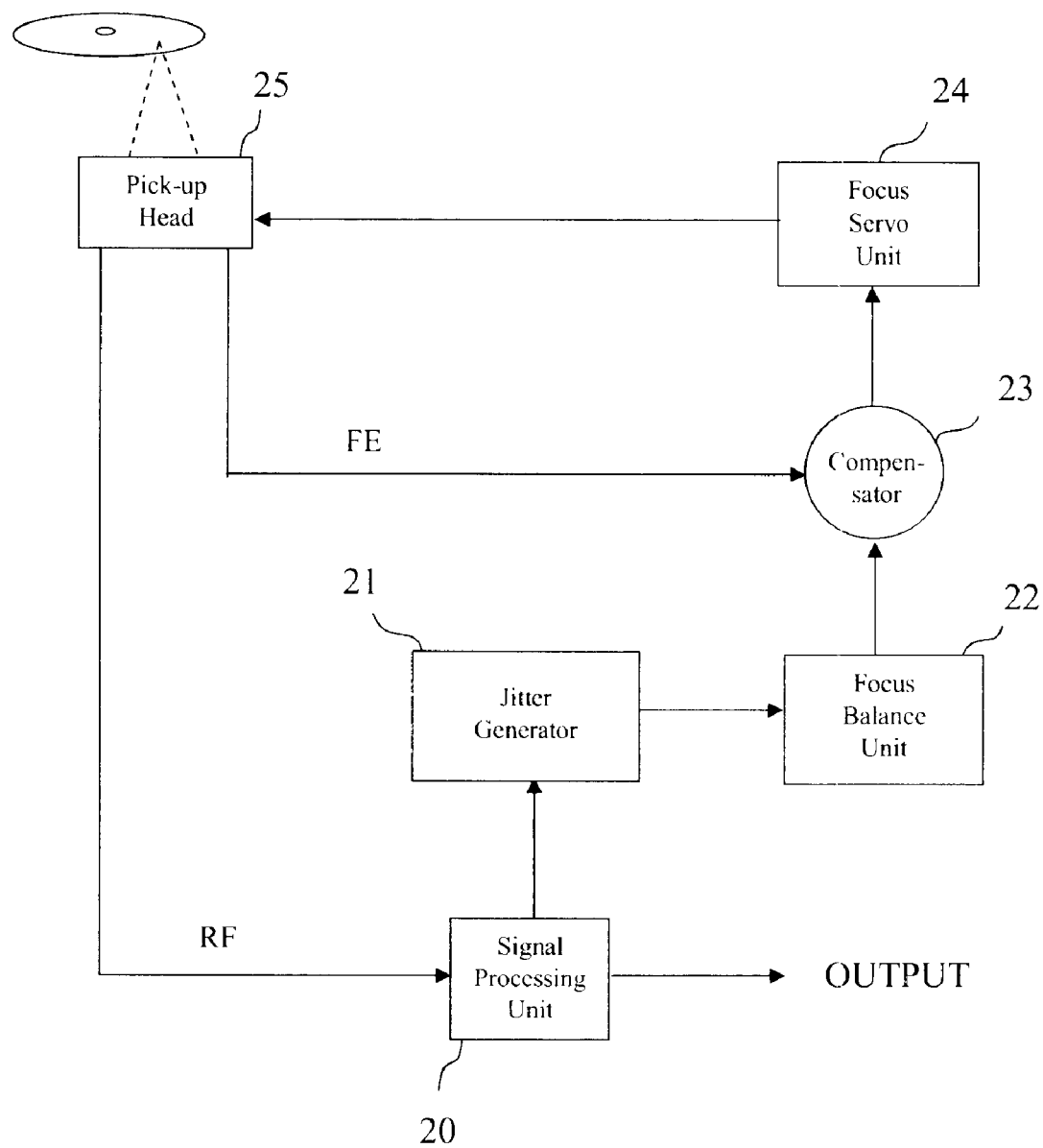
FIG. 3 is a functional block diagram of the apparatus for calibrating focus in a disk drive according to the present invention.

Referring to FIG. 3, there is the functional block diagram of the apparatus for calibrating focus balance in the optical disk drive according to the present invention. The apparatus for calibrating focus balance in an optical drive comprises a signal processing unit 20, a jitter generator 21, a focus balance unit 22, a compensator 23, a focus servo unit 24, and a pick-up head 25. Primarily, the radio frequency signal RF output upon reading the marks on the optical disk by the pick-up head 25 in the optical disk drive is processed by the signal processing unit 20, and from which a jitter signal is separated by the jitter generator 21 to generate a jitter frequency. Further, an error signal is generated by the focus balance unit 29 and transferred to the compensator 23. A focus control signal is generated in combination with the focus error signal FE. The pick-up head 25 is controlled by the focus servo unit 24 to automatically calibrate the focus balance, whereby maintaining the quality of the read/write signal.

In addition, the focus balance unit 22 is for comparing the jitter frequencies input by the jitter generator 21, which mainly employs the calibration of focus balance to compare the generated sequential jitter frequencies, and then check the convergence of the jitter frequencies to determine the direction and variable of the next calibration of focus balance. The movement of the pick-up head is further calibrated by the compensator 23 via the focus servo unit 24 to achieve focus balance, such that the jitter frequency is maintained within an acceptable goal range for facilitating the normal operation of the optical disk drive, thereby enhancing the total performance of the optical disk drive.

Figure 4:
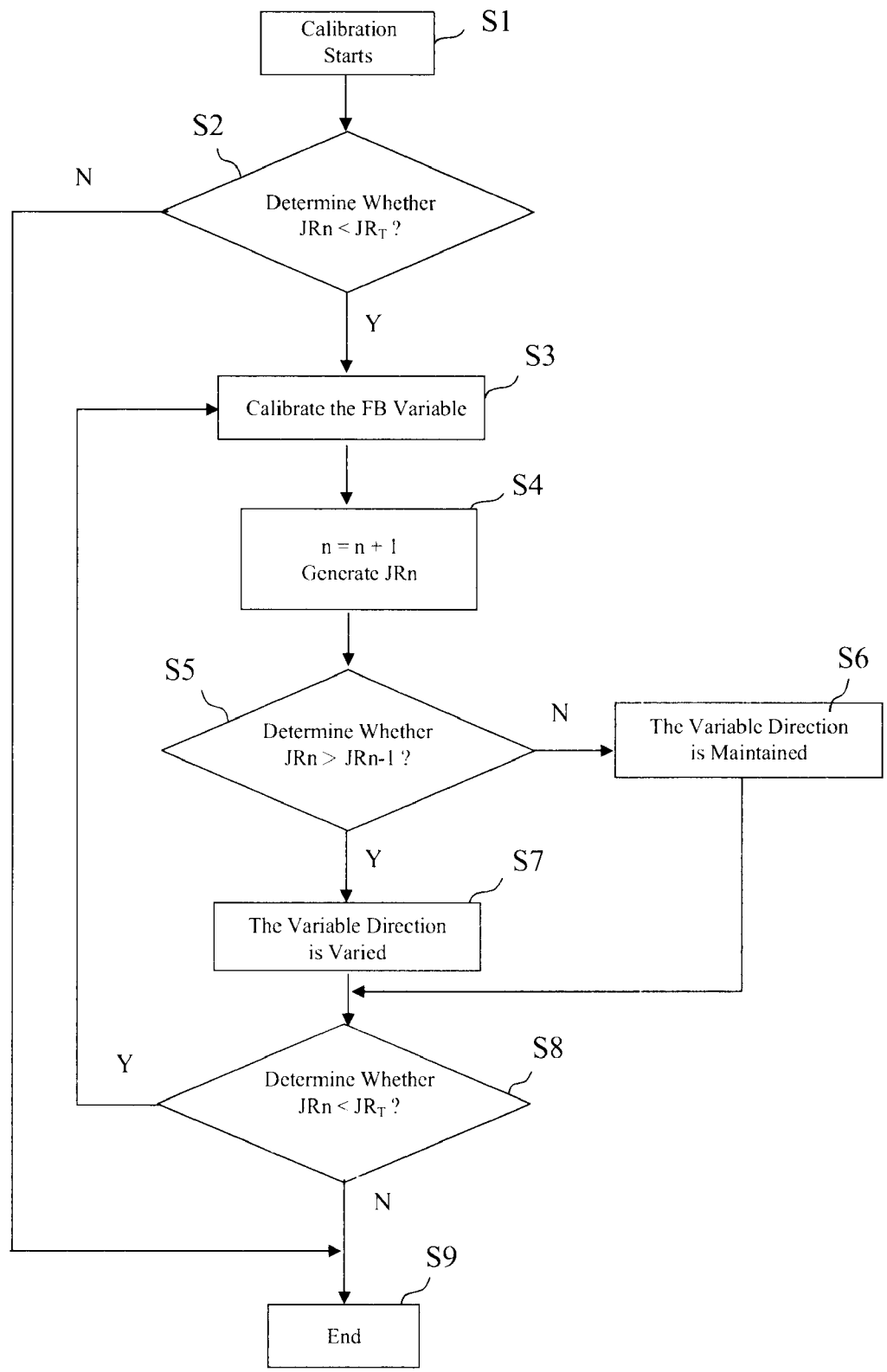
FIG. 4 is a flowchart of the method for calibrating focus balance in an optical disk drive according to the present invention.

Referring to FIG. 4, there is a flowchart of the focus balance calibration according to the present invention. When the jitter frequency is not within the acceptable range due to the abnormal focus balance, the present invention starts calibration of focus balance. Before calibration starts, the optical disk drive presets the variable $\Delta FB$ of calibrating focus balance to a predefined value, e.g. $\Delta FB=5$, the direction for calibrating focus balance to an increasing direction, and the acceptable goal of jitter frequency to $JR_T$. The method for calibrating focus balance includes the following steps:

Step S1: Calibration of focus balance starts. The reference value of focus balance is zeroed first, i.e. FB=0.

Step S2: The currently input jitter frequency is set to JRn and compared with the goal $JR_T$, i.e. examining whether the jitter frequency JRn is less than $JR_T$. If the signal value of the jitter frequency JRn is not less than the goal $JR_T$, i.e. the jitter frequency JRn is within an acceptable range, then the original focus balance is maintained and the method proceeds to step S9. If the jitter frequency JRn is less than the goal $JR_T$, i.e. the jitter frequency JRn is out of the acceptable range, then the focus balance is inappropriate and calibration of the focus balance is required and the method proceeds to the next step.

Step S3: By setting the direction of calibrating focus balance to an increasing direction, the focus balance FB is calibrated to increase a predefined value of $\Delta FB$.

Step S4: The ordinal n is made equivalent to n+1 for generating a new jitter frequency JRn.

Step S5: The new jitter frequency JRn is compared with the previous jitter frequency JRn−1, i.e. examining whether the new jitter frequency JRn is greater than JRn−1. If the jitter frequency JRn is greater than JRn−1, then the method proceeds to step S6. If the jitter frequency is not greater than JRn−1, then the method proceeds to step S7.

Step S6: When the jitter frequency JRn is greater than JRn−1, the increasing direction is an appropriate convergent direction and the original preset direction of the variable, i.e. the increasing direction, is maintained, and the method proceeds to step S8.

Step S7: When the jitter frequency JRn is less than JRn−1, the increasing direction is incorrect and the preset direction of the variable, i.e. the decreasing direction, is varied, and the method proceeds to the next step S8.

Step S8: Re-examination is conducted to determine whether the jitter frequency JRn is less than the goal $JR_T$, i.e. examining whether the calibrated jitter frequency JRn has fallen within an acceptable range. If the jitter frequency JRn is less than $JR_T$, which indicates that the focus balance is still inappropriate and further calibration of focus balance is required, then the method returns to step S3, continuing the calibration step. If the jitter frequency JRn is not less than the goal JR, i.e. the calibrated jitter frequency JRn is within the acceptable range, then the current focus balance is maintained and the method proceeds to the next step.

Step S9: After the focus balance is calibrated and the jitter frequency JRn becomes greater than the goal $JR_T$ again, the calibration step is terminated immediately.

Accordingly, the present invention is able to separate a jitter signal from a radio frequency signal RF output from the pick-up head by a jitter generator to generate a jitter frequency. The focus balance unit compares the generated sequential jitter frequencies to examine the convergence thereof, and the direction and variable of focus balance are calibrated and transferred to the compensator. A focus control signal is generated in combination with the focus error signal FE, and the pick-up head is controlled by the focus servo unit to rapidly achieve focus balance for minimizing the generation of error and saving the operation time, thereby enhancing the total performance of the optical disk drive.

Although the aforementioned embodiment of the method for calibrating focus balance according to the present invention presets the convergent direction of the focus balance to an increasing direction and uses a constant focus balance variable ΔFB for description, setting the convergent direction of the focus balance to a decreasing direction or using an inconstant focus balance variable ΔFB may also achieve the objectives of the present invention without departing from the scope thereof.

The descriptions are given by way of example and in terms of preferred embodiment, and it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for calibrating focus balance in an optical disk drive, wherein said optical disk drive employs a focus servo unit for controlling focus of a pick-up head and reading marks to generate an RF signal, the apparatus for calibrating focus comprising:

a jitter generator which separates a jitter signal from the RF signal to form a jitter frequency;

a focus balance unit which compares sequential jitter frequencies input by the jitter generator to check a convergence and a goal of the jitter frequencies to generate an error signal; and a compensator which receives the error signal from the focus balance unit through the focus servo unit to control the pick-up head for calibrating focus balance.

2. The apparatus for calibrating focus balance in an optical disk drive according to claim 1, further comprising a signal processing unit which receives the RF signal from the pick-up head to process into a data signal for output, and the jitter generator separating the jitter signal from the RF signal.

3. The apparatus for calibrating focus balance in an optical disk drive according to claim 1, wherein the error signal is generated by determining a direction and a variable of calibrating focus balance based on checking the convergence of the jitter frequencies.

4. A method for calibrating focus balance in an optical disk drive, comprising the steps of:

(1) zeroing a reference value;

(2) calibrating a variable of focus balance to generate a new jitter frequency:

(3) examining whether the new jitter frequency is less than a goal, where if the new jitter frequency is less than the goal, then return to step (2), otherwise if the new jitter frequency is not less than the goal of the jitter frequency, then proceed to the next step; and (4) terminating calibration.

5. The method for calibrating focus balance in an optical disk drive according to claim 4, wherein the goal of the jitter frequency in the optical disk drive is preset.

6. The method for calibrating focus balance in an optical disk drive according to claim 4, wherein the reference value zeroed at step (1) is a focus-balanced reference value FB that equals 0.

7. The method for calibrating focus balance in an optical disk drive according to claim 4, wherein after said step (1) is completed further comprises the step of:

(1a) examining whether the jitter frequency is less than the goal, if the jitter frequency is not less than the goal, then proceed to the step (4), if the jitter frequency is less than the goal, then proceed to the step (2).

8. The method for calibrating focus balance in an optical disk drive according to claim 4, wherein the optical disk drive presets the variable ΔFB and the direction of calibrating focus balance.

9. The method for calibrating focus balance in an optical disk drive according to claim 8, wherein each variable ΔFB varied by calibrating the focus balance at the step (2) is a predefined value.

10. The method for calibrating focus balance in an optical disk drive according to claim 9, wherein after said step (2) is completed further comprises the step of:

(2a) examining whether the new jitter frequency is greater than the previous jitter frequency, if the new jitter frequency is not greater than the previous jitter frequency, then the direction of the variable ΔFB is changed and proceed to the step (3), otherwise if the new jitter frequency is greater than the previous jitter frequency, then the original direction of the variable ΔFB is maintained and proceed to the step (3).

11. The method for calibrating focus balance in an optical disk drive according to claim 10, wherein the direction of the variable ΔFB is set to an increasing direction.

12. The method for calibrating focus balance in an optical disk drive according to claim 10, wherein the direction of the variable ΔFB is set to a decreasing direction.

13. The method for calibrating focus balance in an optical disk drive according to claim 10, wherein the variable ΔFB is an inconstant predefined value.

14. The method for calibrating focus balance in an optical disk drive according to claim 10, wherein the variable ΔFB is a constant predefined value.

* * * * *